(12) United States Patent
Levine et al.

(10) Patent No.: US 10,750,715 B1
(45) Date of Patent: Aug. 25, 2020

(54) BIOMASS CLUMPING MATERIAL AND METHOD

(71) Applicant: Lignetics, Inc., Louisville, CO (US)

(72) Inventors: Jonah Levine, Lafayette, CO (US); Frank Kvietok, Aurora, CO (US)

(73) Assignee: Lignetics, Inc., Louisville, CO (US)

( * ) Notice: Subject to any disclaimer, the term of this patent is extended or adjusted under 35 U.S.C. 154(b) by 0 days.

(21) Appl. No.: 16/528,575

(22) Filed: Jul. 31, 2019

(51) Int. Cl.
*A01K 1/015* (2006.01)
*B27N 5/00* (2006.01)

(52) U.S. Cl.
CPC ............ *A01K 1/0155* (2013.01); *B27N 5/00* (2013.01)

(58) Field of Classification Search
CPC ..... A01K 1/0155; A01K 1/0152; A01K 1/015
See application file for complete search history.

(56) References Cited

U.S. PATENT DOCUMENTS

| | | | |
|---|---|---|---|
| 5,927,049 A | 7/1999 | Simard | |
| 6,053,125 A | 4/2000 | Kory et al. | |
| 6,662,749 B1 | 12/2003 | Wiedenhaft et al. | |
| 7,124,710 B2 | 10/2006 | Weaver | |
| 8,418,652 B1 * | 4/2013 | Mallard | A01K 1/0155 119/171 |
| 8,720,375 B2 | 5/2014 | Miller et al. | |
| 8,733,288 B2 | 5/2014 | Winkleman et al. | |
| 9,185,878 B2 | 11/2015 | Kuras et al. | |
| 9,398,754 B2 | 7/2016 | Zhang et al. | |
| 9,439,393 B1 | 9/2016 | Kuras et al. | |
| 9,491,926 B2 | 11/2016 | Lipscomb et al. | |
| 9,549,533 B2 | 1/2017 | Raymond | |
| 10,058,070 B2 | 8/2018 | Drief et al. | |
| 10,212,916 B2 | 2/2019 | Drief et al. | |
| 2005/0056229 A1 * | 3/2005 | Greene | A01K 1/0152 119/173 |
| 2008/0022940 A1 * | 1/2008 | Kirsch | A01K 1/0152 119/173 |
| 2008/0184939 A1 * | 8/2008 | Fritter | A01K 1/0152 119/173 |
| 2010/0006035 A1 * | 1/2010 | Spittle | A01K 1/0152 119/172 |
| 2013/0199456 A1 * | 8/2013 | Bracilovic | A01K 1/0155 119/173 |
| 2013/0213309 A1 * | 8/2013 | Wang | A01K 1/0152 119/165 |
| 2013/0213312 A1 * | 8/2013 | Wang | A01K 1/0155 119/171 |
| 2015/0128869 A1 * | 5/2015 | Raymond | A01K 1/0155 119/172 |
| 2017/0049072 A1 * | 2/2017 | Oestergaard | A01K 1/0155 |

(Continued)

*Primary Examiner* — Kristen C Hayes
(74) *Attorney, Agent, or Firm* — Durham Jones & Pinegar; Sarah W. Matthews

(57) ABSTRACT

A process for making an animal litter from a woody biomass starting material is described, with the performance amendments substantially located entirely on the outside surface of the woody biomass particles. The process may include the steps of densifying the biomass starting material, crumbling the densified biomass material; screening the densified biomass material for size; optionally adding a zeolite containing a scent; spray coating the sized, densified biomass particles with a surface adhesion agent; and powder dosing the sized, densified biomass particles and zeolites with a performance amendment comprising equal parts bentonite and guar gum.

17 Claims, 3 Drawing Sheets

(56) References Cited

U.S. PATENT DOCUMENTS

| | | | |
|---|---|---|---|
| 2018/0263210 A1* | 9/2018 | Ehrler | A01K 1/0155 |
| 2019/0150395 A1* | 5/2019 | Li | A01K 1/0154 |
| 2019/0274274 A1* | 9/2019 | Huck | A01K 1/0155 |

* cited by examiner ns material. starting material.
BIOMASS CLUMPING MATERIAL AND METHOD

TECHNICAL FIELD

The present invention relates generally to a clumping animal litter. More specifically, the present invention relates to a method and formulation of clumping animal litter comprising a majority of biomass starting material.

BACKGROUND

Clumping animal litters often use clay for absorption. The clump strength of clay litters containing equal or greater than ninety percent sodium bentonite are strong enough to form a clump shape on contact with moisture, and hold and retain the shape on scooping without pieces of the litter breaking off of the clump, so the clump may be fully removed from a litter box. However, sodium bentonite clay is a limited resource and is also very heavy, and therefore difficult and costly to handle, package and transport. Other performance amendments used for litters may also be expensive.

Thus, animal litters that include lighter materials and minimize the use of clay and other performance amendments, while still providing good clumping performance, may be desirable. It also may be desirable to use renewables in the formation of the animal litter, such as renewable starting materials to form the litter. The process for forming the litter often results in these performance amendments being dispersed throughout the litter product (such as on the inside of an agglomerate or throughout an agglomerate) where they are not as effective. Thus, it may be desirable to form a product which maximizes the effectiveness of the performance amendment. Additionally, it may be desirable to provide positive scent delivery to reduce malodor.

SUMMARY

According to one aspect, a process for making an animal litter is disclosed, and may include the steps of: providing a woody biomass starting material having an aspect ratio of 3:1 or less; densifying the biomass starting material to form a densified biomass material; crumbling the densified biomass material; screening the densified biomass material to select densified biomass material having a particle size of about US mesh 20 to about US mesh 8 and to form sized, densified biomass particles; adding a zeolite containing a scent to the sized, densified biomass particles; spray coating the sized, densified biomass particles and zeolite with a surface adhesion agent; and powder dosing the sized, densified biomass particles and zeolites with a performance amendment comprising equal parts bentonite and guar gum.

According to one aspect, the animal litter may comprise about 80 to about 90 percent by weight sized, densified biomass particles; about 3 to about 6 percent by weight surface adhesion agent; about 2 to about 5 percent by weight zeolite; about 3 to about 8 percent by weight sodium bentonite; and about 3 to about 8 percent by weight guar gum. In some configurations, the ratio of sized, densified biomass particles to the sodium bentonite is about 6 to 1 to about 10 to 1.

According to another aspect, the woody biomass starting material may have a bulk density of about 10 pounds per cubic foot to about 15 pounds per cubic foot.

In some implementations, the step of densifying the biomass starting material to form the densified biomass material comprises pelletizing the biomass starting material. The sized, densified biomass particles may have an associated bulk density of about 0.3 g/cc to about 0.5 g/cc. In one implementation, the sized, densified biomass particles have an associated bulk density of about 0.45 g/cc.

According to another aspect, a process for making an animal litter is described and may comprise the steps of: selecting densified biomass particles having a particle size of about US mesh 40 to about US mesh 4; spray coating the densified biomass particles with a surface adhesion agent, the surface adhesion agent comprising about 2% to about 6% by weight of the animal litter, to form coated, densified biomass particles; and adding one or more performance amendments to the coated, densified biomass particles.

In some configurations, the step of adding one or more performance amendments comprises powder dosing the coated, densified biomass particles with one or more performance amendments. The one or more performance amendments may comprise at least one absorbent performance amendment and at least one rigidifying amendment. For example, one or more performance amendments may comprise at least one of guar gum, bentonite, CMC, and pre-gel starch. In one implementation, the one or more performance amendments comprises a mixture of about 3.5% guar gum and 3.5% bentonite to about 8% guar gum and 8% bentonite by weight.

According to yet another aspect, an animal litter product is disclosed, comprising about 80 to about 90 percent by weight densified, sized biomass material; about 2 to about 6 percent by weight surface adhesion agent; and about 6 to about 18 percent by weight performance amendment. In some configurations, the densified, sized biomass material has a particle size of about US mesh 40 to about US mesh 4. The performance amendment may comprises a mixture of guar gum and bentonite.

According to another aspect, the animal litter product disclosed herein has an external surface area with at least 80 to at least 90 percent of the external surface of the litter comprising the performance amendment. In some implementations, at least 90% of the external surface area of litter comprises at least one of bentonite and guar gum.

According to yet another aspect, a method is disclosed herein for delivering a fragrance in an animal litter over time, the method comprising: selecting densified biomass particles; adding a zeolite containing the fragrance to the densified biomass particles; spray coating the biomass particle-zeolite mixture with a surface adhesion agent to form coated biomass particles; and powder dosing one or more performance amendments on the coated biomass particles. The method may also comprise exposing the animal litter to moisture, and wherein the moisture triggers release of the fragrance from the zeolite.

BRIEF DESCRIPTION OF DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views.

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

FIG. 1 is a flowchart of an exemplary method for forming an animal litter as disclosed herein.

DETAILED DESCRIPTION

Figure 1:
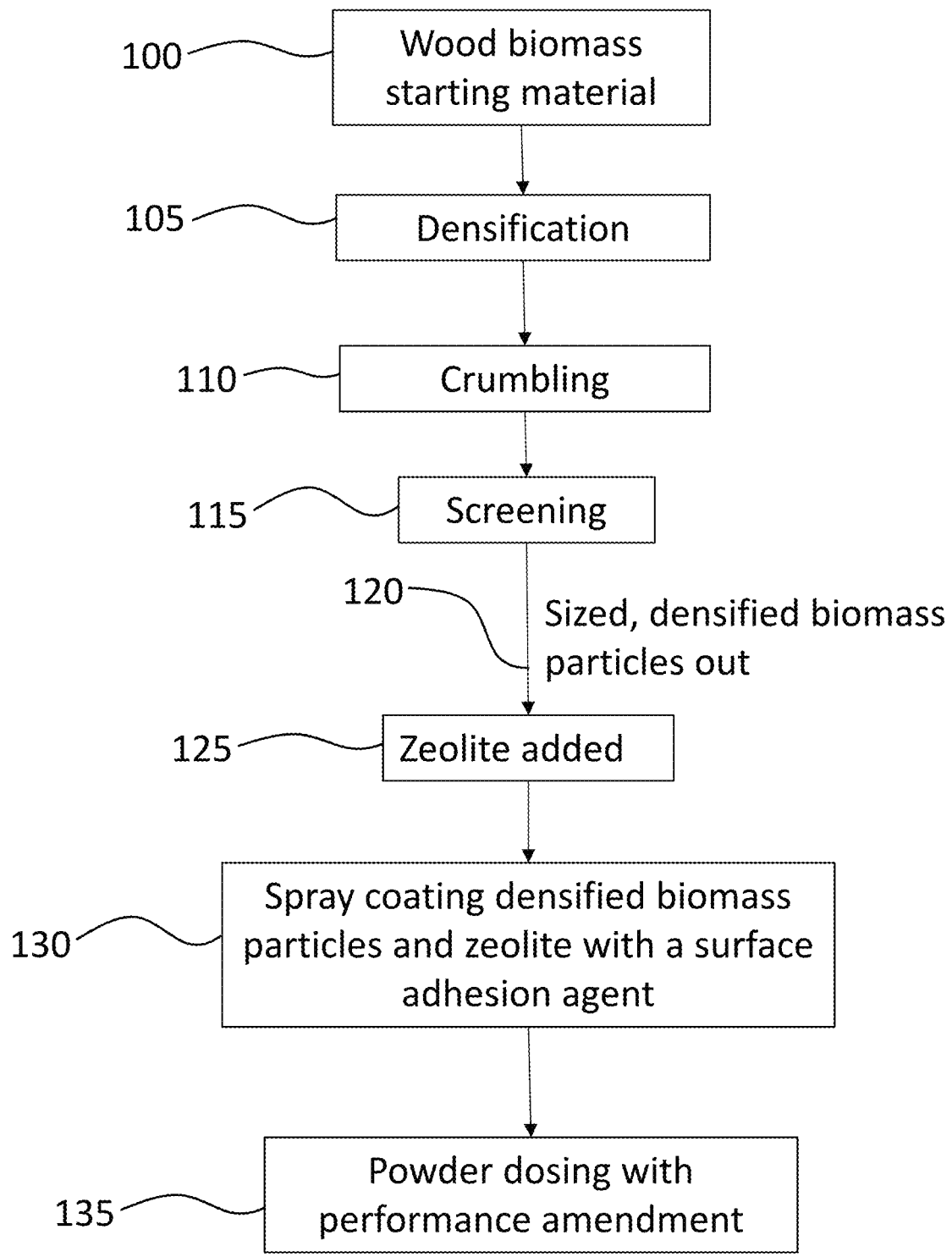

The following provides a detailed description of particular embodiments of the present invention. Reference will now be made to the drawings in which the various elements of the illustrated configurations will be given numerical designations and in which the invention will be discussed so as to enable one skilled in the art to make and use the invention. It is to be understood that the following description is only exemplary of the principles of the present invention, and should not be viewed as narrowing the scope of the claims which follow, which claims define the full scope of the invention.

It will be appreciated that various aspects discussed in one drawing may be present and/or used in conjunction with the embodiment shown in another drawing, and each element shown in multiple drawings may be discussed only once. For example, in some cases, detailed description of well-known items or repeated description of substantially the same configurations may be omitted. This facilitates the understanding of those skilled in the art by avoiding an unnecessarily redundant description. The accompanying drawings and the following description are provided in order for those skilled in the art to fully understand the present disclosure, and these are not intended to limit the gist disclosed in the scope of claims.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

It should also be noted that, as used in this specification and the appended claims, singular forms such as "a," "an," and "the" may include the plural unless the context clearly dictates otherwise.

As used herein, the term "substantially" refers to the complete or nearly complete extent or degree of an action, characteristic, property, state, structure, item, or result to function as indicated. For example, a performance amendment that is "substantially" located on the outside of a biomass particle would mean that the performance amendment is either completely located on the outside surface of a biomass particle or nearly completely located on the outside surface of a biomass particle. The exact allowable degree of deviation from absolute completeness may in some cases depend on the specific context. The use of "substantially" is equally applicable when used in a negative connotation to refer to the complete or near complete lack of an action, characteristic, property, state, structure, item, or result.

As used herein the term "generally" refers to something that is more of the designated adjective than not, or the converse if used in the negative. For example, something maybe said to be generally sized to the size of rough sand, even though it has some particles that may be somewhat larger and some particles that may be somewhat smaller than rough sand.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

According to one aspect, the present disclosure relates to a process for making an animal litter. The process may generally comprise the steps of providing a biomass starting material, densifying the biomass starting material, crumbling the densified biomass material, screening the densified biomass material, optionally adding a zeolite, and adding one or more performance amendments to the screened/sized biomass material. One exemplary process is generally outlined in FIG. 1. While the steps in FIG. 1 are shown as discrete steps, it will be appreciated that one or more steps may be taken at the same time and that some steps may be performed in a different order than that shown in FIG. 1. According to one implementation, the steps may be performed in the order shown in FIG. 1. In other implementations, the steps may be performed substantially in the order shown in FIG. 1 or in a different order or with some steps happening at the same time. For example, the step of adding a zeolite containing the fragrance to the densified biomass particles to form a biomass particle-zeolite mixture may be performed after the step of spray coating the biomass particle-zeolite mixture with a surface adhesion agent to form coated biomass particles, etc.

Figure 2:
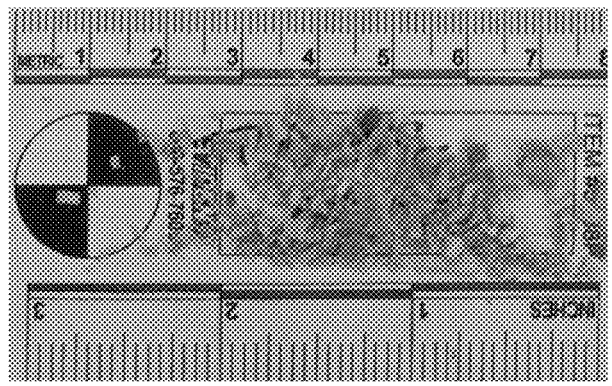
FIG. 2 is a photograph of an exemplary biomass starting material.

The biomass starting material may be any suitable biomass known in the art. In some configurations, the biomass starting material may have an aspect ratio of 3:1 or less. A woody biomass material may be used, such as biomass from wood manufacturing residues, or other types of agricultural biomass products may be used. For example, the biomass material may be selected from corncob grit, corn cob, corn meal, soybean, soybean meal, wheat meal, wheat straw, alfalfa meal, peanut hulls, rice hulls, walnut shells, paper, paper sludge, pine sawdust, diaper fluff, and any combination thereof. The biomass starting material may have a bulk density of about 10 pounds per cubic foot to about 15 pounds per cubic foot. Biomasses with a bulk density of less than 10 pounds and greater than 15 pounds per cubic foot may also be used. FIG. 2 shows a photograph of one exemplary woody biomass starting material having an aspect ratio of 3:1 or less. The biomass starting material may, for example, have a moisture content range from about 5% to about 12%, or in other configurations, the biomass starting material may have a moisture content range from about 5% to about 25%.

Figure 3:
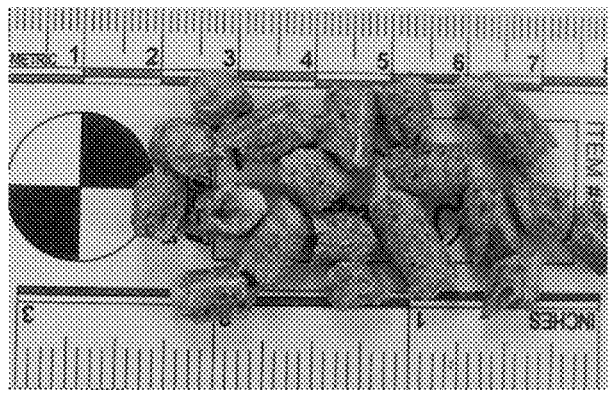
FIG. 3 is a photograph of the biomass material of FIG. 2 after it has been densified.

After an appropriate woody biomass starting material is selected (100 in FIG. 1), the biomass starting material may be densified (105) according to any known method in the art for densification. For example, the biomass starting material may be extruded into a pellet or otherwise densified. In other configurations, the biomass starting material may be densified by rollers, extrusion, etc. FIG. 3 shows a photograph of the woody biomass material of FIG. 2 after it has been densified by pelletization.

After the biomass is densified, it may then be crumbled (110 in FIG. 1) and screened (115) for size to form sized, densified biomass particles (120). In some configurations, it may not be necessary to crumble and screen the densified biomass. It may be desirable to size the particles in the range of 3 mm to 0.6 mm, so the final product resembles coarse grain sand. This may attract animal use (such as cats who may prefer a sand-like texture) and also increase paw comfort for the animal. Additionally, a small particle size may facilitate a favorable percolation rate for clumping and odor control performance.

Figure 4:
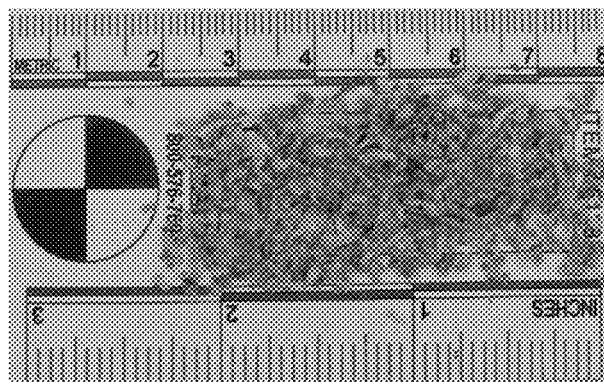
FIG. 4 is a photograph of the biomass material of FIG. 3 after it has been crumbled and sized.

In some configurations, the densified and crumbled biomass may be screened to have a particles size of about US mesh 40 to about US mesh 4. In other configurations, the size may be more narrowly selected, such as about US mesh 30 to about US mesh 6, or about US mesh 20 to about US mesh 8. The sized, densified biomass particles may have an associated bulk density of about 0.3 g/cc to about 0.5 g/cc, and in some configurations may have an associated bulk density of about 0.45 g/cc. FIG. 4 shows a photograph of the pellets of FIG. 3 after they have been crumbled screened for size.

In some configurations, it may be desirable, but not necessary, to provide a method for positive scent deliver for the animal litter. According to one method, a zeolite containing a positive fragrance may be added to the densified, sized biomass material (125). The zeolite may be spray coated with surface adhesion agent and performance amendments along with the densified, sized biomass material as described below. The zeolite may emit fragrance over time, and addition of moisture to the animal litter product may trigger an increased release of the fragrance from the zeolite as described below.

The sized, densified biomass particles (with or without the addition of a zeolite containing a scent) may be coated with a surface adhesion agent (130). Coating may be by simple admixing of the particles with the surface adhesion agent. According to one configuration coating may occur by spray coating to ensure more even coverage of the surface adhesion agent. Any suitable surface adhesion agent may be used, and in one configuration, an oil may be used. Any suitable oil may be used, and by way of example and not limitation, linseed oil, mineral oil, bio-oils generally (coconut, soy, or any refined bio-oil), etc., may be used. Similarly, the surface adhesion agent may be selected from one of the following: water, a polyvinyl alcohol, a latex, a starch, corn syrup, corn syrup solids, or any combination thereof. The surface adhesion agent may comprise about 2% to about 6% by weight of the animal litter. The surface adhesion agent may also reduce dust in the final litter product.

After coating with one or more surface adhesion agents, the biomass particles may then be coated with one or more performance amendments (135). This may be accomplished by admixing, powder dosing, or any other suitable process.

The performance amendments may include, for example, compounds or materials selected for their ability to absorb liquids. It also may be desirable to choose performance amendments to optimize the curing of the performance amendment on the outside of the biomass particles. For example, guar gum is known to cure fairly rigidly/hard, and sodium bentonite is known to cure fairly flexibly/soft. A combination of hard-curing and soft-curing performance amendments may optimize performance of the animal litter by optimizing the percolation rate for clumping and odor control performance.

For example, the performance amendments may include one or more of a rigidifying amendment and one or more of an absorbent amendment. The performance amendment may include one or more of guar gum, sodium bentonite, carboxymethylcellulose, pre-gel starch, attapulgite, bentonite, kaolinite, sepiolite, a polysaccharide gum, sodium alginate, tara gum, xanthan gum, locust bean gum, cassia gum, a fine particle biomass such as 100 mesh wood flour, amylopectin (acid hydrolyzed), sodium carboxymethylcellulose, dextrin, *Solanum tuberosum* starch, polyacrylates, polysaccharides, or a starch, or any combination thereof. For example, in some configurations, the one or more performance amendments may comprise a mixture of about 3.5% guar gum and 3.5% sodium bentonite to about 8% guar gum and 8% bentonite by weight. The amount of total performance amendment by weight in the animal litter may be about 6 to about 18 percent by weight.

Figure 5:
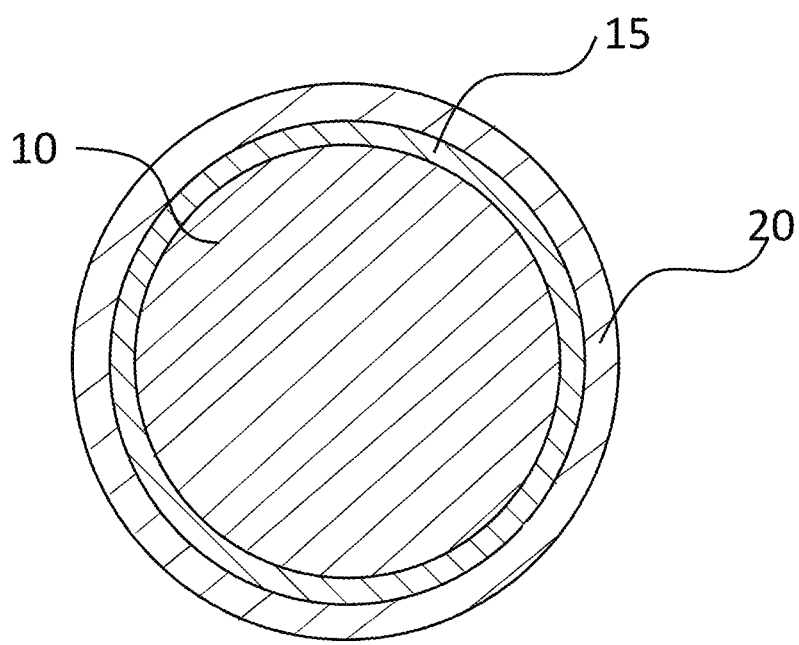
FIG. 5 is a diagrammatic representation of a cross-sectional view of a biomass particle of the clumping material described herein.

By first spraying an adhesion agent and then powder dosing with a performance amendment, it may allow a majority of the performance amendment to be located on the external surface of the animal litter. It has been found that use of this process to form the animal litter may result in over 80 percent of the external surface area of the animal litter comprising one or more performance amendments. In other configurations, over 90 percent of the external surface area of the animal litter may comprise one or more performance amendments. FIG. 5 is a schematic representation of a cut-away view of a particle formed by the methods taught in this disclosure, and may include a densified, sized biomass particle 10, coated in a surface adhesion agent 15, and one or more performance amendments 20.

Performance amendments are often the most expensive manufacturing component of an animal litter. According to many prior art methods, the performance amendments are located within the agglomerates of animal litter rather than on the external surface area, reducing their effectiveness and thus increasing cost of production. Because of the effectiveness of the animal litter according to the present disclosure, more biomass may be used, and less performance amendment. For example, in some configurations, the ratio of sized, densified biomass particles to the bentonite is about 6 to 1 to about 10 to 1. In other configurations the ratio of sized, densified biomass particles to the bentonite is about 5 to 1 to about 20 to 1.

According to another aspect, a method for delivery of a positive fragrance is disclosed. For example, after the starting biomass material is densified and sized, a zeolite containing a fragrance to be released may be added to the sized, densified biomass particles. Then the mixture of zeolite and biomass may be spray coated or mixed with a surface adhesion agent, and then powder dosed or mixed with a performance amendment. This final litter product may comprise both coated biomass particles and coated zeolite particles, each with the performance amendment substantially on the outer surface of the particles. Fragrance may be released over time from the zeolite, and as the litter is exposed to moisture, the moisture may seep into the coated zeolite particles and trigger an increased release of the fragrance.

Table I sets forth one specific formula for an animal litter as disclosed herein:

TABLE I

| Component | % by Weight |
|---|---|
| Biomass | 84.5 |
| Surface Adhesion Agent | 4 |
| Zeolite containing fragrance | 3.5 |
| Performance Amendment | 8 (4 guar gum and 4 sodium bentonite) |
| Total | 100 |

Table II sets forth another specific formula for an animal litter as disclosed herein:

TABLE II

| Component | % by Weight |
|---|---|
| Biomass | 80.5 |
| Surface Adhesion Agent | 4 |
| Zeolite containing fragrance | 3.5 |
| Performance Amendment | 12 (6 guar gum and 6 sodium bentonite) |
| Total | 100 |

Table III shows moisture and bulk density of the animal litter product through various stages of the formation process (from starting material to finished product). Note that the moisture is given as a set point for bulk density, but the moisture is not a limiting factor of performance.

TABLE III

|  | Starting Biomass | Densified Biomass | Sized, Densified Biomass | Final Animal Litter Product |
|---|---|---|---|---|
| Moisture | 6.72% | 5.38% | 6.98% | n/a |
| Bulk Density | 0.21 g/cc (13.1 lbs/cu-ft) | 0.58 g/cc (36.2 lbs/cu-ft) | 0.40 g/cc (25 lbs/cu-ft) | 0.46 g/cc (28.7 lbs/cu-ft) |

While the present disclosure has been generally described with application to an animal litter, other applications of the disclosure are possible and contemplated here. For example, the material may be used in other settings where absorbent materials may be applied, such as industrial and commercial settings to facilitate final clean-up of a liquid spill, etc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A process for making an animal litter comprising:
   providing a woody biomass starting material;
   densifying the woody biomass starting material to form a densified biomass material;

crumbling the densified biomass material;
screening the densified biomass material to select densified biomass material having a particle size of about US mesh 20 to about US mesh 8 and to form sized, densified biomass particles;
adding a zeolite containing a scent to the sized, densified biomass particles;
spray coating the sized, densified biomass particles and zeolite with a surface adhesion agent;
powder dosing the sized, densified biomass particles and zeolites with a performance amendment comprising equal parts bentonite and guar gum.

2. The process of claim 1, wherein the animal litter comprises about 80 to about 90 percent by weight sized, densified biomass particles; about 3 to about 6 percent by weight surface adhesion agent; about 2 to about 5 percent by weight zeolite; about 3 to about 8 percent by weight bentonite; and about 3 to about 8 percent by weight guar gum.

3. The process of claim 1, wherein the ratio of sized, densified biomass particles to the performance amendment is about 6 to 1 to about 15 to 1.

4. The process of claim 1, wherein the woody biomass starting material has a bulk density of about 10 pounds per cubic foot to about 15 pounds per cubic foot.

5. The process of claim 1, wherein the step of densifying the woody biomass starting material to form the densified biomass material comprises pelletizing the woody biomass starting material.

6. The process of claim 5, wherein the sized, densified biomass particles have an associated bulk density of about 0.3 g/cc to about 0.5 g/cc.

7. The method of claim, 1, wherein the step of providing a woody biomass starting material comprises providing a woody biomass starting material having a ratio of length to width of 3:1 or less.

8. A process for making an animal litter comprising:
selecting densified, crumbled, agglomerate biomass particles having a particle size of about US mesh 40 to about US mesh 4;
spray coating the densified biomass particles with an oil-based surface adhesion agent, the surface adhesion agent comprising about 2% to about 6% by weight of the animal litter, to form coated, densified biomass particles;
adding one or more performance amendments to the coated, densified biomass particles.

9. The process of claim 8, wherein the step of adding one or more performance amendments comprises powder dosing the coated, densified biomass particles with one or more performance amendments.

10. The process of claim 9, wherein the one or more performance amendments comprise at least one hard-curing performance amendment and at least one soft-curing performance amendment.

11. The process of claim 10, wherein the one or more performance amendments comprise at least one of guar gum, bentonite, CMC, and pre-gel starch.

12. The process of claim 10, wherein the one or more performance amendments comprises a mixture of about 3.5% guar gum and 3.5% bentonite to about 8% guar gum and 8% bentonite by weight.

13. The process of claim 12, wherein the ratio of densified, crumbled, agglomerate biomass particles to the one or more performance amendments is about 6 to 1 to about 15 to 1.

14. The process of claim 10, wherein the one or more performance amendments comprises a mixture of about 3% guar gum to about 8% guar gum by weight and 3% bentonite to about 8% bentonite by weight.

15. A method for delivering a fragrance in an animal litter over time, the method comprising:
selecting densified, crumbled, agglomerate biomass particles;
adding a zeolite containing the fragrance to the densified biomass particles to form a biomass particle-zeolite mixture;
spray coating the biomass particle-zeolite mixture with surface adhesion agent to form coated biomass particles;
powder dosing one or more performance amendments on the coated biomass particles.

16. The method of claim 15, wherein the method further comprises exposing the animal litter to moisture, and wherein the moisture triggers release of the fragrance from the zeolite.

17. The method of claim 15, wherein the step of spray coating the biomass particle-zeolite mixture with a surface adhesion agent to form coated biomass particles comprises spray coating only the densified biomass particles, and wherein the step of adding the zeolite containing the fragrance to the densified biomass particles to form the biomass particle-zeolite mixture is performed after the step of spray coating the densified biomass particles with the surface adhesion agent to form coated biomass particles.

* * * * *